United States Patent [19] [11] 3,917,705
Swanson et al. [45] Nov. 4, 1975

[54] PRODUCTION OF SECONDARY ALKYL PRIMARY AMINES
[75] Inventors: Ronald W. Swanson, Croton-on-Hudson; Hyung K. Zang, Hopewell Junction, both of N.Y.
[73] Assignee: Texaco Inc., New York, N.Y.
[22] Filed: Dec. 26, 1973
[21] Appl. No.: 428,553

[52] U.S. Cl............. 260/583 M; 260/688; 260/644
[51] Int. Cl.² C07C 85/11; C07C 85/00; C07C 87/04
[58] Field of Search................ 260/583 M, 688, 644

[56] References Cited
UNITED STATES PATENTS
3,470,252   9/1969   Doyle et al..................... 260/583 M Primary Examiner—Joseph P. Brust
Attorney, Agent, or Firm—T. H. Whaley; C. G. Ries; George J. Darsa

[57] ABSTRACT

A process for selectively converting n-paraffins to secondary alkyl primary amines where byproduct formation is substantially reduced which comprises contacting the n-paraffin in a plurality of reaction zones with a nitrating agent, removing gaseous reaction products and water from the liquid products of each of the reaction zones and introducing nitrating agent along with liquid product from the preceding zone into each succeeding reaction zone, thereby effecting an overall conversion to nitroparaffin not exceeding 25 weight percent of the n-paraffin, and thereafter hydrogenating the nitroparaffin to the amine.

18 Claims, No Drawings

PRODUCTION OF SECONDARY ALKYL PRIMARY AMINES

This invention relates to the production of amines and more specifically to the production of secondary alkyl primary amines having from 6 to 30 carbon atoms from paraffin hydrocarbons. In particular, this invention relates to a continuous process for the production of high purity secondary alkyl primary amines from paraffin hydrocarbons.

Processes for the production of secondary alkyl primary amines from paraffin hydrocarbons have been previously described as, for example, in U.S. Pat. No. 3,470,252. In general, the amines have been prepared by nitrating paraffins with nitric acid or nitrogen dioxide and thereafter reducing the nitroparaffins with hydrogen in the presence of a hydrogenation catalyst. The product resulting from the nitration and hydrogenation reactions provides not only the desired amine, but also additionally contains by-products of each of the previous reactions. To provide amines of high purity, it is necessary to treat the hydrogenated nitroparaffin product employing various separation and recovery techniques, as for example, the methods developed and disclosed in U.S. Pat. No. 3,470,251.

Notwithstanding the advances made in the art, formation of substantial amounts of byproducts seriously reduces the attractiveness of the process. The preparation of secondary alkyl primary amines from n-paraffins would be substantially improved if the process could be made more selective to the amine products with a concomitant reduction in the amount of byproducts formed. A reduction in byproduct formation would provide substantial savings in terms of the materials and costs associated with the required purification techniques, wherein amine products are provided having purities exceeding values of 98%. In continuous processing, where unconverted paraffins and by-products are contemplated for recycle, the process would also be substantially improved by providing recycled feedstock possessing a reduced by-product content.

The principal source of by-products is derived from the initial nitration involving reaction between the nitrating agent, such as nitrogen dioxide and nitric acid and the paraffin where up to about 50 percent of the paraffin has been converted principally to the nitroparaffin. In addition to the principal nitroparaffin product, there is found through a series of complex mechanisms a plurality of other materials including nitrites, nitrates, olefins, ketones, alcohols, acids, and polyfunctionals such as nitroalcohols, dinitroparaffins, nitroketones, trinitroparaffins, nitroacids and nitroolefins. The by-products can in effect constitute up to 50 weight percent of the nitrated product excluding unreacted paraffin. The propensity of the reaction to form byproducts seriously reduces the selectivity of the process insofar as the production of nitroparaffin and ultimately secondary alkyl primary amines are concerned. Moreover, in continuous processing, including recycle of selected streams to the initial nitration reaction there will occur in the course of long periods of operation a substantial conversion to nitration byproducts which interferes with the orderly conversion at high selectivity of the paraffin to the amine and which leads to a highly unsatisfactory and cost-prohibitive operation.

It is therefore an object of this invention to provide a process for selectively converting paraffin hydrocarbons to secondary alkyl primary amines.

Another object of this invention is to provide a process for the production of secondary alkyl primary amines from n-paraffins wherein byproduct formation is substantially reduced.

Yet another object of this invention is to provide a process wherein secondary alkyl primary amines are prepared from n-paraffins by means of a continuous process wherein byproduct formation is substantially reduced and where the amines are recovered in high purity.

Other objects and advantages will become apparent from a reading of the following detailed description and examples.

SUMMARY OF THE INVENTION

Broadly, this invention contemplates a process for producing secondary alkyl primary amines from n-paraffins wherein the n-paraffin is nitrated with a nitrating agent, consisting essentially of nitrogen dioxide to form a nitroparaffin, and where the nitroparaffin is hydrogenated to the amine, the improvement which comprises contacting at a temperature of from 270°F. to 400°F., preferably from 320°F. to 370°F., the n-paraffin in a plurality of reaction zones in series with from 0.03 to 0.4 mole of nitrating agent per mole of n-paraffin, preferably from 0.06 to 0.25 mole, in each of the reaction zones, removing gaseous reaction products and water from the liquid products of each of the reaction zones, and introducing nitrating agent along with liquid product from the preceding reaction zone into each succeeding reaction zone thereby effecting conversion of the n-paraffin to nitroparaffin in each of the reaction zones, wherein the overall conversion to nitroparaffin in the plurality of reaction zones ranges from 10 weight percent and does not exceed 25 weight percent of the n-paraffin.

PARAFFIN HYDROCARBONS

The paraffin hydrocarbons contemplated in this invention are straight chain aliphatic hydrocarbons containing from 6 to 30 carbon atoms. Such hydrocarbons include n-hexane, n-heptane, n-octane, n-decane, n-dodecane, n-tetradecane, n-pentadecane, n-octadecane, n-eicosane, n-pentacosane, n-triacontane, and mixtures thereof.

Typical paraffin hydrocarbons and mixtures thereof applicable to this invention include hydrocarbons containing from 6 to 30 carbon atoms which may be obtained, for example, by absorption in molecular sieves or such other processes as urea or solvent dewaxing, which are capable of recovering n-paraffins from mixtures of isoparaffins, naphthenes, aromatics, and n-paraffins. Mixtures of n-paraffins having from 6 to 10 or 10 to 14, or 14 to 17 carbon atoms can be obtained by absorption in molecular sieves. Likewise, mixtures containing from 15 to 21 carbon atoms or 20 to 30 carbon atoms can be obtained by means of urea complexation or solvent dewaxing and are also contemplated as starting materials.

NITRATION

The nitration of the paraffin hydrocarbons to secondary mono-nitroparaffins is conducted in a plurality of reaction zones in series in a liquid-vapor process. From 2 to 10, and preferably 2 to 4, reaction zones in series are employed where the liquid product of the preceding reaction zone is the charge for the subsequent zone. Each reaction zone is provided with means for introducing nitrating agent for contact with the paraffin and gaseous reaction products and water are removed from the liquid products of each zone. The number of reaction zones employed is governed by the overall conversion desired of n-paraffin to nitroparaffin, such that the greater the conversion desired, the higher the number of zones employed. In particularly desirable embodiments, two or three reaction zones are employed. In practice, conversion of n-paraffin to nitroparaffin of about 15 weight percent can be suitably undertaken in two reaction zones. Where conversions of about 20 percent paraffin to nitroparaffin are desired, 3 reaction zones are appropriate and conversions up to 25 weight percent are suitably conducted in four or more reaction zones.

By secondary mono-nitroparaffins we mean that the nitro group is predominantly located on other than the paraffin's terminal carbon atoms. Illustrative mononitroparaffins include 2 or 3-nitrohexane, 2, 3 or 4-nitroheptane, 2, 3 or 4-nitrooctane, 2, 3, 4 or 5-nitrodecane, 2, 3, 4, 5 or 6-nitroundecane, 2, 3, 4, 5 or 6-nitrododecane, 2, 3, 4, 5, 6 or 7-nitrotridecane, 2, 3, 4, 5, 6 or 7-nitrotetradecane, 2, 3, 4, 5, 6, 7, 8 or 9-nitrooctadecane and mixtures thereof.

The nitration reaction is initiated by introducing the n-paraffin into the first of the series of reaction zones and by contacting the n-paraffin with a nitrating agent, namely nitrogen dioxide, at a temperature of from about 270°F. to 400°F., preferably from about 320° to 370°F. at pressures ranging from about 100 mm. Hg to about 20 atmosphere, most preferably at pressures of from 1 to 3 atmospheres. Where the heavier hydrocarbons are used, such as $C_{15}$ and heavier, subatmospheric pressures are advantageous in order to maintain byproduct water in the vapor form. To effectively control the amount of byproducts formed in the first reaction zone, the amount and rate of nitrating agent contacted with the n-paraffin is closely controlled such that the rate of nitrating agent addition ranges from about 0.03 to 0.4, most preferably 0.06 to 0.25, mole of nitrating agent per mole of paraffin. Where it is contemplated to employ a large number of reaction zones, as for example, 6 or more, the amount of nitrating agent addition in the initial and subsequent zones would fall within the lower ranges specified above. Where 2 to 4 reaction zones are contemplated, amounts of nitrating agent within the higher range outlined above are appropriate. It is appreciated that, in general, approximately equal amounts of nitrating agent would be added to each reaction zone. Maintaining the nitrating agent ratio within the ranges specified above in each of the plural reaction zones in combination with the removal of gaseous reaction products and water from the liquid product of each zone leads to higher selectivities for the conversion of the paraffin to the nitroparaffin along with a substantial reduction in by-product formation. In the first reaction zone, depending upon the total number of reaction zones contemplated, the conversion is undertaken such that from about 2 to 12 percent, preferably from 5 to 10 percent, of the paraffin is converted to the corresponding mononitroparaffin. Conversions in the first reactor exceeding 12 percent should be avoided inasmuch as prolonged nitration in the presence of unreacted nitrating agent and byproduct water promote the formation of substantial amounts of undesired byproducts, such as $C_6$ to $C_{30}$ ketones, alcohols, carboxylic acids, nitrites and polyfunctional materials such as dinitroparaffins, nitroketones, nitroalcohols, nitroacids and nitroolefins while concomitantly decreasing the selectivity to monoparaffins.

Gaseous reaction products and water are removed from the liquid products prior to introducing the liquid product of the preceding zone into the succeeding reaction zone. The gaseous reaction products and water can be continuously removed, if desired, in each of the zones. Alternatively, and following contacting in the first or subsequent reaction zones, the crude nitrated material is separated into a liquid product and off-gases. The off-gases are primarily composed of paraffins along with nitrogen dioxide, nitric oxide, nitrous oxide, nitrogen, carbon dioxide, carbon monoxide and water. Removal of the off-gases and particularly water from the crude nitrated liquid material prior to introduction of the liquid product into the succeeding reaction zone deters formation of additional by-products, particularly the polyfunctional materials mentioned above. Paraffins can be recovered from the off-gases and recycled to the initial reaction zone. Nitric oxide present in the off-gas can be oxidized and converted to nitrogen dioxide and thereafter recycled to the initial nitrating zone. Non-condensable gases, such as nitrogen, carbon dioxide and carbon monoxide can be vented.

The formation of multi-functional byproducts in the initial reaction zone is likewise deterred by undertaking limited conversions employing the mole ratios of nitrating agent to paraffin specified above. The multi-functional by-products formed such as dinitroparaffins, nitroalcohols, nitroacids, nitroolefins, nitroketones and trinitroparaffins are dependent upon the average concentration of non-paraffins such as nitroparaffins, ketones and alcohols in the reaction zone taken in combination with the amount of conversion that occurs within the reaction zone. In the plural reaction zones outlined herein, the sum of the multifunctional by-products equals that amount formed in each reaction zone. The amount formed through the use of plural reaction zones is less than the amount of byproducts which would otherwise be formed if overall conversion were undertaken in a sigle zone. The removal of water between reaction stages is critical in minimizing by-product formation. It is believed that by-product water from nitration can react with the nitroparaffin to form oxygenated byproducts or under certain conditions with the nitrating agent, nitrogen dioxide to form nitric acid which if present in a substantial amount will form a separate liquid phase. The formation of a nitric acid phase should be avoided in that the nitroparaffin and liquid byproducts are substantially more soluble than the n-paraffin and would extract the nitroparaffin from the paraffin phase, which solubility leads to the generation of polyfunctional materials at the expense of the nitroparaffin.

Following removal of the off-gases and water, the crude nitrated liquid product from the initial reaction zone typically comprises from about 84 to 98 weight percent n-paraffins, 2 to 12 weight percent nitroparaffins, and 0.2 to 4 weight percent liquid byproducts. This crude nitrated product from the initial reaction zone is thereafter introduced to the next reaction zone, wherein unconverted paraffin is contacted with fresh nitrating agent at a temperature of from about 270°F. to 400°F., preferably 320°F. to 370°F. under conditions including pressure described in connection with the initial reaction zone. Additional conversion of the paraffin to nitroparaffin is permitted to take place wherein off-gases and water are removed from the crude nitrated product in the manner described above in the contacting in the initial reaction zone. As in the case of the first reaction zone, effective control over byproduct formation is accomplished by limiting the amount of nitrating agent contacted with unreacted paraffin along with the separation of the off-gases and water. It will be understood that off-gas and water removal can be undertaken continuously in the course of reaction in each of the reaction zones, or off-gas and water separation can be effected at the completion of the contacting step in each reaction zone. Further, since the nitration reaction is highly exothermic, the use of plural reaction zones and off-gas removal provides a degree of interstage cooling or temperature adjustments.

The nitrations through the plural reaction zones as mentioned above are carried out until up to about 25 percent of the original paraffinic charge is converted to mononitroparaffins. Conversions substantially exceeding 25 percent are not advantageous since substantial amounts of polyfunctional materials are produced. It has been found that the combination of maintaining the rate of nitrating agent introduction to each of the reaction zones within the ranges specified above, the narrow temperature ranges employed in each of the reaction zones, and the effective removal of off-gases and water permits the nitration to proceed in a highly selective manner, thereby maximizing the amount of mononitroparaffin formed and simultaneously minimizing the formation of substantial amounts of by-products.

The crude liquid nitrated product derived from the last of the plural reaction zones is recovered substantially free of off-gaseous materials and water. This crude material is composed of predominantly unconverted n-paraffin, up to 25% of mononitroparaffin and minimal amounts of byproducts. The mononitroparaffins so prepared may, if desired by separated and recovered from the crude product by distillation or extraction with carbon dioxide in the presence of alcoholic potassium hydroxide. In another embodiment, the crude material can be directly introduced to a hydrogenation zone for conversion to the corresponding amine. Preferably, the crude liquid product is caustic-washed in an aqueous medium prior to the hydrogenation step. It has been found that washing with caustic prolongs the life of the hydrogenation catalysts which are otherwise adversely affected by certain constituents of the crude product. The caustic treatment employs, for example, aqueous solutions of alkali or alkaline earth metal oxides, hydroxides, carbonates, or bicarbonates, such as sodium hydroxide, potassium hydroxide, lime, sodium carbonate, sodium bicarbonate, and ammonium hydroxide. By way of illustration, caustic washing of 10 to 30 parts of crude nitrated product with about 1 part of 10 percent aqueous sodium hydroxide has been found beneficial in prolonging the hydrogenation catalyst's life and permitting extended on-stream hydrogenation times.

The caustic wash can be undertaken in a conventional mixer-settler system which extracts up to about 10 percent of the total nitroparaffins contained in the crude composition. Alternatively, countercurrent towers may be employed where the crude nitration product flows upwardly in countercurrent contact with the downwardly flowing fresh caustic solution. In a highly preferred embodiment, caustic washing of the crude nitration product is undertaken in a packed tower operating countercurrently wherein the contact time of the crude nitration product is greatly reduced and the requirement of caustic solution is likewise reduced. This system has the advantage of providing the washed nitration product with a low caustic concentration, as for example, low sodium content, and the washed nitrated product can, if desired, be hydrogenated to amines without water washing. Preferably, the caustic treated crude nitrated product is water-washed so as to substantially reduce any residual caustic content. The employment of a countercurrent tower represents a substantial saving of capital investment in that settlers and waste streams can be minimized. The caustic washing is undertaken at temperatures of from 100° to 250°F. and preferably from 160°F. to 200°F.

HYDROGENATION

The nitroparaffins described above contained in the crude nitrated product are hydrogenated to secondary alkyl primary amines at average conversion temperatures ranging from about 100°F. to 450°F., preferably between 200°F. and 400°F., under hydrogen pressures ranging from about 200 to 1500 p.s.i.g. While the hydrogenation reaction is exothermic in nature, the reaction itself can be conducted isothermally. Isothermal operations can be accomplished by employing heat exchange means in the hydrogenation reactor or additional paraffin hydrocarbons in the range of $C_6$ to $C_{30}$ can be added to the crude nitrated material. Preferably, the hydrogenation reaction is conducted in a manner such that the crude nitrated product is introduced to the hydrogenation reactor along with hydrogen at an inlet temperature of at least 100°F. and up to 400°F., and the nitroparaffin is hydrogenated to the corresponding amine at an average conversion temperature of from 200°F. to 450°F. and up to a maximum conversion temperature of 500°F. In one embodiment, the difference between the maximum conversion temperature and the inlet temperature of the reactor is at least 100°F. and up to 400°F., particularly preferred differences, $\Delta T$, between the maximum conversion temperature and the temperature at the inlet being from 150°F. to 300°F. Temperatures exceeding 500°F. should be avoided as such conditions cause loss of nitrogen from the charge stock. Further, high temperatures cause formation of secondary amines at the expense of primary amine formation. In general, the conversion is undertaken at mole ratios of hydrogen to nitroparaffin ranging from about 2.4:1 to 7.0:1, preferably from 3:1 to 4:1.

The hydrogenation is conveniently conducted in the presence of conventional and well-known hydrogenation catalysts, such as members of Groups IB, VIB, VIIB, and VIII of the Periodic Table. Illustrative of the Group IB members are copper employed alone or in combination with a Group VIB member, as for example, copper chromite. As Group VIB members we mention chromium, molybdenum, and tungsten and combinations thereof. Group VIIB members are represented by rhenium, and Group VIII members include platinum, palladium, rhodium, ruthenium, nickel and cobalt. The members may be present as the metal or compound thereof. Moreover, the member may be present on a support such as carbon, silica, kieselguhr, or alumina. Preferred hydrogenation catalysts are composed of the metals of Groups VIIB or VIII, including rhenium, platinum, palladium, rhodium, and ruthenium on one of the supports mentioned above, where the metal is present in the catalyst in an amount of from about 0.1 to 10.0 weight percent. A particularly preferred catalyst is palladium on a support of carbon.

AMINE ISOLATION AND RECOVERY

Conventional recovery procedures may be employed in recovering the amine as by distilling the hydrogenated product by stepwise fractionation. Alternatively, the amine may first be converted and recovered as an amine salt by reaction with an inorganic acid followed by further treatment of the amine salt with alkali and thereafter recovering the primary amine by distillation.

A highly preferred procedure involves formation of a secondary alkyl primary amine - carbon dioxide complex. This method involves treating the amine-containing hydrogenation product with carbon dioxide at about 15° to 100°C. under pressures ranging from 100 to 500 p.s.i.g., where the hydrogenated product is admixed with from about 1 to 10 moles of carbon dioxide per mole of amine present in the hydrogenation product until substantial quantities of an amine-carbon dioxide complex are formed in mixture with paraffin and by-products. This mixture is thereafter contacted with from about 1 to 5 parts by weight of an alkanol-water solvent mixture substantially saturated with carbon dioxide. Contacting the paraffin and complex with the solvent mixture causes a solvent phase to form containing substantially all of the amine-carbon dioxide complex and a paraffin phase containing substantially all of the byproducts. The solvent phase containing the amine-carbon dioxide complex either is heated to a temperature of about 60° to 150°C. or the pressure of the solvent phase is reduced thereby springing the amine and flashing off carbon dioxide. The amine is recovered from the solvent by distillation or a combination of distillation and decantation, and the purity of the amine recovered is in excess of 98 weight percent.

The by-products of the nitration and hydrogenation reaction recovered in the paraffin phase and, if desired, with the byproducts and unconverted materials recovered from the distillation or decantation of the solvent phase are upgraded by hydrogenating the same and thereafter introducing the hydrogenated material to the initial nitration reaction zones. Typically, the recovered material undergoing hydrogenation is predominantly n-paraffin containing significant amounts of oxygenated and nitrated by-products such as alcohols, ketones, nitroparaffins and polyfunctionals including nitroketones, nitroalcohols, and dinitroparaffins. Hydrogenation of the oxygenated and nitrated by-products to n-paraffins prior to reintroduction to the plural nitration reaction zones is undertaken at temperatures of from about 400° to 750°F. under hydrogen pressures of from 100 to 1,500 p.s.i.g. and at liquid hourly space velocities of from 0.1 to 20 volumes of liquid per volume of catalyst per hour. Within this range, we prefer temperatures of from 525°F. to 575°F. under hydrogen pressures of from 400 to 600 p.s.i.g. and space velocities of from 2 to 5. In general, hydrogenation may be conducted in the presence of known and conventional hydrogenation catalysts illustrated by nickel, cobalt, platinum, palladium, and rhodium.

The high purity amines provided by the instant process can be employed as mold-release agents, emulsion freeze-thaw stabilizers, pigment dispersing agents, polyurethan catalysts, and anti-caking anti-dusting agents. Their uses are also indicated as corrosion inhibitors, deleterious bacteria control agents, sludge dispersants, and as detergents and de-icers in gasolines.

In order to more fully illustrate the nature of this invention and the manner of practicing the same, the following examples are presented. In these examples the best mode contemplated for carrying out the invention is set forth.

EXAMPLE I

A continuous process for converting n-paraffins to secondary alkyl primary amines is undertaken by providing a fresh $C_{10}$ to $C_{14}$ paraffin hydrocarbon composition having the following carbon chain length distribution on a weight percent basis:

$C_{10}$ 11.1, $C_{11}$ 28.7, $C_{12}$ 32.2, $C_{13}$ 26.9 and $C_{14}$ 1.1.

To 10.7 weight percent of fresh normal paraffins there is mixed 89.3 weight percent of previously processed and purified recycle paraffins. The n-paraffin charge is continuously introduced to a first nitration reactor at the rate of 939 pounds per hour along with 30.5 pounds per hour of nitrogen dioxide wherein nitration proceeds at 330°F. under a pressure of 4 p.s.i.g. Off-gases comprising paraffin, nitrogen dioxide, nitric oxide, nitrous oxide, nitrogen, carbon monoxide, carbon dioxide and water are drawn overhead from the first reactor, the off-gases partially condensed, and condensed paraffin recycled to the first reactor. Nitric oxide in the overhead gas is oxidized to nitrogen dioxide, the oxidized gas cooled to condense nitrogen dioxide, and the liquefied nitrating agent recycled to the first reactor. Non-condensable gases including nitrogen, nitrous oxide, carbon monoxide, carbon dioxide, and oxygen are vented.

The crude nitrated paraffin product of the first reactor comprising 90.3% n-paraffin, 7.5% nitroparaffin, and 2.2% oxidized paraffin and polyfunctionals, is continuously charged to a second nitration reactor along with 29.9 pounds per hour of nitrogen dioxide where nitration in the second zone proceeds at 330°F. under a pressure of 4 p.s.i.g. Off-gases from the second reactor are similar to those produced in the first nitration reactor and are handled in the same manner as the off-gases from the first reactor.

The crude nitrated paraffin product from the second reactor comprising 80.9% n-paraffin, 14.7% nitroparaffin, and 4.4% oxidized paraffin and polyfunctionals, is continuously caustic washed with about 70 pounds per hour of 10% aqueous sodium hydroxide in a line mixer at 200°F. and 50 p.s.i.g. The resulting aqueous layer is separated in a settler and removed. The organic layer is washed at 180°F. and 50 p.s.i.g. with 27 pounds per hour of water in a conventional countercurrent extraction tower. The washed crude nitrated product contains 129 pounds of nitrated paraffin and 833 pounds of n-paraffin and other materials.

The crude nitrated paraffin composition is introduced at an inlet temperature of 200°F. to a hydrogenation reactor containing a hydrogenation catalyst composed of one weight percent palladium on carbon at a liquid hourly space velocity of 2.0 volumes of liquid per volume of catalyst per hour. Hydrogenation is conducted under a hydrogen pressure of 560 p.s.i.g. and up to a maximum conversion temperature of 410°F. Following hydrogenation, substantially all of the nitroparaffin is reduced to amine. Hydrogen, ammonia and some water are removed as gases and remaining water and ammonia are decanted from the recovered crude hydrogenation product at 110°F.

950 pounds per hour of crude hydrogenation product comprising 834 pounds of n-paraffins and miscellaneous by-products, 100 pounds of secondary alkyl primary amine, about 1 pound of unconverted nitroparaffins and 15 pounds of water and ammonia is contacted and saturated with 87 pounds per hour of carbon dioxide at 300 p.s.i.g. and 110°F. thereby forming an amine-carbon dioxide complex. The carbon dioxide saturated crude hydrogenation product is countercurrently contacted in a tower with 1,500 pounds per hour of a solvent mixture comprising 40% methanol and 60% water, the solvent mixture having been previously saturated with 50 pounds per hour of carbon dioxide at 300 p.s.i.g. and 110°F. Upon contacting of the carbon dioxide saturated crude hydrogenation product with the solvent mixture the primary amine complex transfers from the predominantly paraffin stream to the solvent stream.

The amine depleted paraffin stream is subsequently reduced to atmospheric pressure in a flash drum whereupon carbon dioxide contained therein is removed overhead. The amine-enriched solvent stream is heated to a temperature of 150°F. and introduced to a flash tower maintained at atmospheric pressure where carbon dioxide, along with some methanol and water, are removed overhead. The amine-rich liquid from the flash tower is passed through a fractionator where methanol, residual carbon dioxide, and some water are removed overhead. The bottom stream containing water and crude amines separates as two phases, namely a water phase containing some methanol and amines, and a crude amine phase containing some water.

110 pounds per hour of the crude amine phase are heated to 248°F. and flashed at 160 mm. Hg thereby removing as overhead substantially all of the residual methanol and water, along with some organic materials. After condensation, the organic matter in the overhead is separated from the aqueous layer and combined with the flashed amine phase. The flashed crude amine phase is thereafter vacuum-distilled at 20 mm. Hg and 200°F. to remove overhead residual methanol, water, paraffinic hydrocarbons and lighter than $C_{10}$ amines. Finally, the amine phase is vacuum distilled at 10 mm. Hg and 300°F. to produce 100 pounds per hour of finished amine containing 98.5 weight percent secondary alkyl primary amines.

The amine-depleted paraffin stream from the raffinate flash drum is combined with the predominantly paraffinic waste streams derived from vacuum distilling the crude amines to form a recycle stream containing n-paraffins and lesser amounts of nitroparaffins, ketones, primary and secondary amines, alcohols, nitrates, nitrites, and polyfunctional derivatives of the n-paraffins. The recycle stream is catalytically hydrogenated at the rate of 840 pounds per hour and hydrogenated first at 400°F. and 3.0 LHSV and thereafter at 660°F. at 1.5 LHSV with 17 pounds per hour of hydrogen at 500 p.s.i.g. After separating hydrogen, ammonia and water the hydrogenated product is recycled for introduction to the first nitration reactor.

EXAMPLE II

A paraffin hydrocarbon charge composed of n-decane was nitrated with nitric acid, the mole ratio of n-decane to nitric acid employed being 1.93 to 1 at 329°F. in a single reactor. The crude product consisted of 10.4 weight percent nitrodecane, 12.7 weight percent oxidized decane and polyfunctionals and the remainder n-decane. This illustrates the poor selectivity employing a single stage nitration using as nitrating agent nitric acid.

EXAMPLE III

A paraffin hydrocarbon charge composed of n-decane was nitrated with nitrogen dioxide, the mole ratio of n-decane to nitrogen dioxide employed being 2.25 to 1, at 317°F. in a single reactor. The crude product consisted of 13.4 weight percent nitrodecane, 7.9 weight percent oxidized decane and polyfunctionals and the remainder n-decane. This illustrates the poor selectivity employing nitrogen dioxide in a single stage nitration.

We claim:

1. In a process for producing secondary alkyl primary amines from n-paraffins having from 6 to 30 carbon atoms wherein said n-paraffin is nitrated with a nitrating agent consisting essentially of nitrogen dioxide to form a nitro-paraffin and where said nitroparaffin is hydrogenated to said amine, the improvement which comprises contacting at a temperature of from 270° to 400°F. said n-paraffin and nitrogen dioxide as nitrating agent at a pressure of from about 100 mm. Hg. to about 20 atmospheres in a plurality of reaction zones in series with from 0.03 to 0.4 mole of said nitrating agent per mole of n-paraffin in each of said reaction zones, removing gaseous reaction products and water from the liquid products of each said reaction zones and introducing nitrating agent along with liquid product from the preceding reaction zone into each succeeding reaction zone, thereby effecting conversion of said n-paraffin to nitroparaffin in each of said reaction zones, wherein the total conversion to nitroparaffin in said reaction zones is from 10 weight percent and does not exceed 25 weight percent of said n-paraffin.

2. A process according to claim 1 wherein said contacting temperature is from 320° to 370°F.

3. A process according to claim 1 wherein from 0.06 to 0.25 mole of nitrating agent per mole of n-paraffin is employed in each of said zones.

4. A process according to claim 1 wherein from 2 to 10 reaction zones are employed.

5. A process according to claim 1 wherein from 2 to 4 reaction zones are employed.

6. A process according to claim 1 wherein two reaction zones are employed.

7. A process according to claim 1 wherein three reaction zones are employed.

8. A process according to claim 1 wherein total conversion of said n-paraffin does not exceed 20 weight percent.

9. A process according to claim 1 wherein total conversion does not exceed 15 weight percent.

10. A process according to claim 1 wherein said nitroparaffin is washed with aqueous caustic prior to hydrogenation.

11. A process according to claim 10 wherein said nitroparaffin is countercurrently contacted with aqueous caustic.

12. A process according to claim 10 wherein said nitroparaffin is washed at a temperature of from 100°F. to 250°F.

13. A process according to claim 1 wherein said n-paraffin comprises a mixture of $C_6$ to $C_{10}$ paraffins.

14. A process according to claim 1 wherein said n-paraffins comprises a mixture of $C_{10}$ to $C_{14}$ paraffins.

15. A process according to claim 1 wherein said n-paraffin comprises a mixture of $C_{14}$ to $C_{17}$ paraffins.

16. A process according to claim 1 wherein said n-paraffins comprises a mixture of $C_{15}$ to $C_{21}$ paraffins.

17. A process according to claim 1 wherein said n-paraffin comprises a mixture of $C_{20}$ to $C_{30}$ paraffins.

18. A process according to claim 1 wherein from about 2 to 12 percent conversion of said paraffin to nitroparaffin is undertaken in a first reaction zone.

* * * * *